(12) United States Patent
Mann

(10) Patent No.: US 7,931,291 B2
(45) Date of Patent: Apr. 26, 2011

(54) FIFTH WHEEL COUPLING ASSEMBLY WITH REMOVABLE LOCKING MECHANISM

(75) Inventor: Steven William Mann, Gardendale, AL (US)

(73) Assignee: Fontaine Fifth Wheel Co., Trussville, AL (US)

( * ) Notice: Subject to any disclaimer, the term of this patent is extended or adjusted under 35 U.S.C. 154(b) by 162 days.

(21) Appl. No.: 12/466,281

(22) Filed: May 14, 2009

(65) Prior Publication Data

US 2011/0042920 A1 Feb. 24, 2011

(51) Int. Cl.
*B62D 53/10* (2006.01)
(52) U.S. Cl. ........................................ 280/434; 280/433
(58) Field of Classification Search ........... 280/433–437
See application file for complete search history.

(56) References Cited

U.S. PATENT DOCUMENTS

| 2,833,559 | A | | 5/1958 | Miner |
|---|---|---|---|---|
| 3,034,805 | A | * | 5/1962 | Becker ........................ 280/434 |
| 3,630,545 | A | * | 12/1971 | Fontaine et al. ............. 280/434 |
| 3,844,584 | A | * | 10/1974 | Fontaine ...................... 280/434 |
| 4,871,182 | A | * | 10/1989 | Altherr et al. ............... 280/434 |
| 5,516,138 | A | * | 5/1996 | Fontaine ...................... 280/434 |
| 5,641,174 | A | * | 6/1997 | Terry et al. .................. 280/434 |
| 5,746,438 | A | | 5/1998 | Bergmann et al. |
| 5,839,745 | A | * | 11/1998 | Cattau et al. ................ 280/434 |
| 5,988,665 | A | * | 11/1999 | Terry et al. .................. 280/434 |
| 6,352,277 | B1 | * | 3/2002 | Timmings .................... 280/437 |
| 6,402,176 | B1 | * | 6/2002 | Timmings .................... 280/433 |
| 7,651,113 | B1 | * | 1/2010 | Mann ............................ 280/434 |
| 2004/0145150 | A1 | * | 7/2004 | Yeakel ......................... 280/433 |
| 2007/0194555 | A1 | * | 8/2007 | Roberts et al. .............. 280/434 |

* cited by examiner

*Primary Examiner* — Joanne Silbermann
*Assistant Examiner* — Michael R Stabley
(74) *Attorney, Agent, or Firm* — George P. Kobler; Lanier Ford Shaver & Payne PC

(57) ABSTRACT

A removable locking mechanism for a fifth wheel hitch is provided which includes a mounting plate removably attachable within a fifth wheel chassis formed to support a fifth wheel hitch plate that has an aperture in the load surface thereof. The mounting plate is formed with a u-shaped throat dimensioned to receive a trailer kingpin and a top surface configured to be co-planar with the fifth wheel hitch plate load surface when seated within the chassis. A locking mechanism for retaining the kingpin against said closed end of the throat is mounted to the underside of the mounting plate and includes a cam arm; and a bumper arm pivotally attached to the cam arm configured to engage a bumper stop formed in the mounting plate underside; a sliding jaw member slidably mounted to the cam arm; and a secondary lock member for preventing unintended disengagement of the lock mechanism.

19 Claims, 6 Drawing Sheets

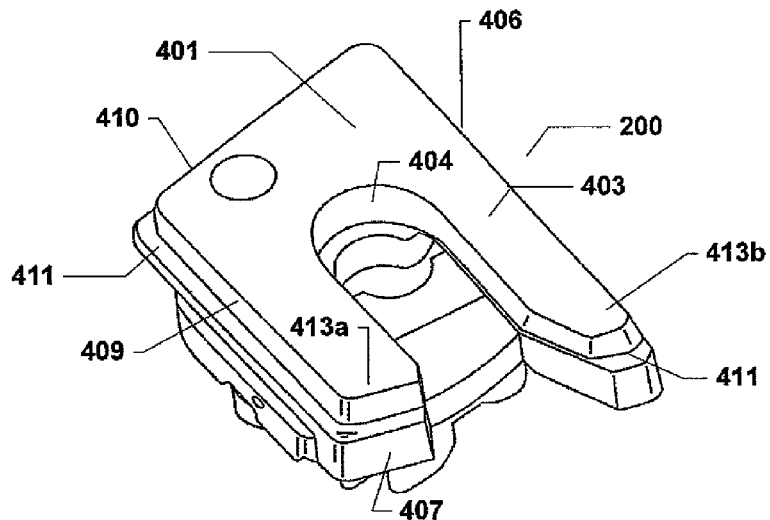
*Fig. 4*
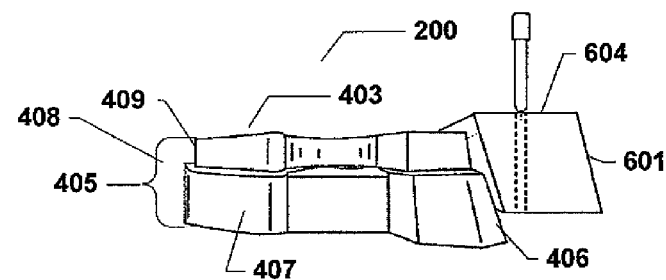
*Fig. 6*
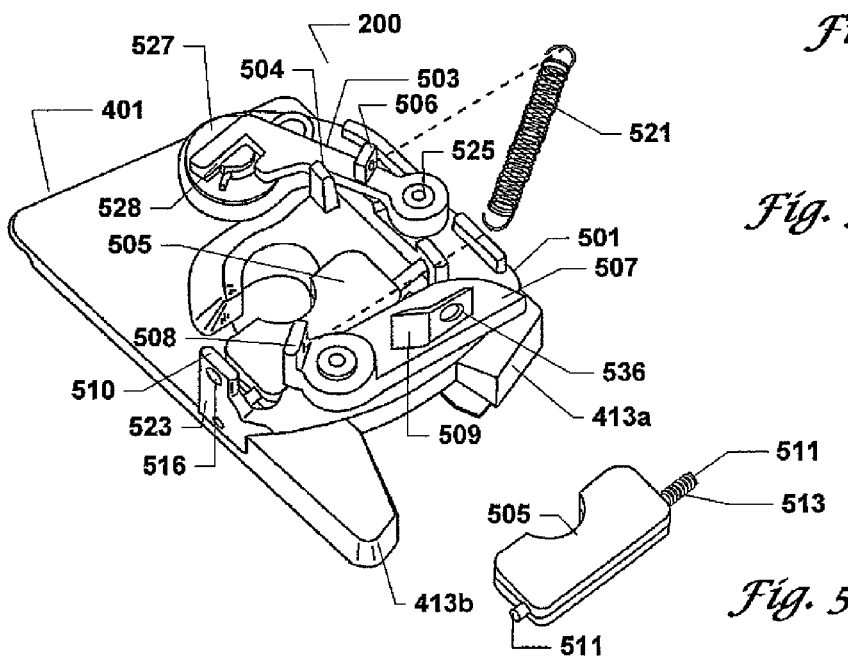
*Fig. 5*
*Fig. 5a*

FIFTH WHEEL COUPLING ASSEMBLY WITH REMOVABLE LOCKING MECHANISM

BRIEF DESCRIPTION OF THE DRAWINGS

The present invention is described with reference to the accompanying drawings. In the drawings, like reference numbers indicate identical or functionally similar elements. Additionally, the leftmost digit(s) of a reference number identifies the drawing in which the reference number first appears.

FIG. 4 is a perspective view of the top side of an exemplary locking mechanism cartridge;

FIG. 6 is an elevational view from the aftward end of the cartridge mounting plate (401) described in FIG. 4;

DETAILED DESCRIPTION

The various embodiments of the present invention and their advantages are best understood by referring to FIGS. 1 through 8 of the drawings. The elements of the drawings are not necessarily to scale, emphasis instead being placed upon clearly illustrating the principles of the invention. Throughout the drawings, like numerals are used for like and corresponding parts of the various drawings.

The drawings represent and illustrate examples of the various embodiments of the invention, and not a limitation thereof. It will be apparent to those skilled in the art that various modifications and variations can be made in the present inventions without departing from the scope and spirit of the invention as described herein. For instance, features illustrated or described as part of one embodiment can be included in another embodiment to yield a still further embodiment. Moreover, variations in selection of materials and/or characteristics may be practiced to satisfy particular desired user criteria. Thus, it is intended that the present invention covers such modifications as come within the scope of the features and their equivalents.

Furthermore, reference in the specification to "an embodiment," "one embodiment," "various embodiments," or any variant thereof means that a particular feature or aspect of the invention described in conjunction with the particular embodiment is included in at least one embodiment of the present invention. Thus, the appearance of the phrases "in one embodiment," "in another embodiment," or variations thereof in various places throughout the specification are not necessarily all referring to its respective embodiment.

Terms such as "aft," "rear," "forward," "front," "lateral," or "outward," or the like, and variants or derivatives thereof are to be understood in relation to the truck or vehicle on which the fifth wheel is mounted. On the other hand, rotational terms such as "clockwise" and "counter-clockwise" are to be understood as viewed in the figure(s) referenced in the detailed description. However, it is to be understood that the invention may assume various alternative orientations, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

This invention may be provided in other specific forms and embodiments without departing from the essential characteristics as described herein. The embodiments described above are to be considered in all aspects as illustrative only and not restrictive in any manner. The appended claims rather than the foregoing description indicate the scope of the invention.

Figure 1A:
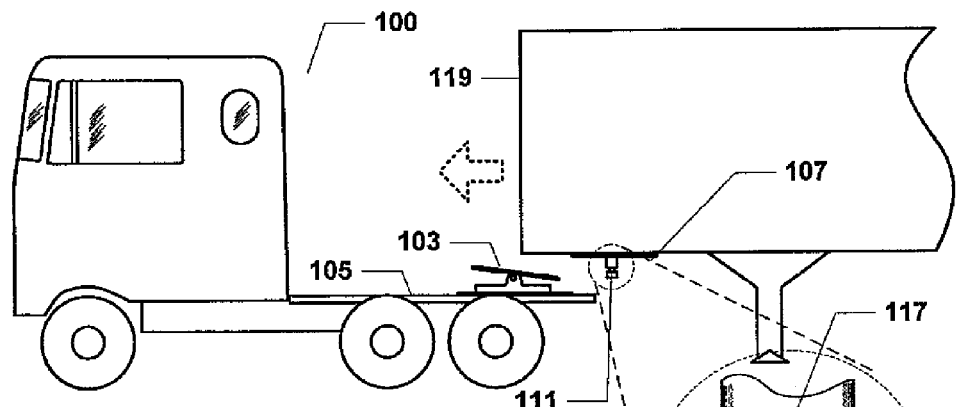
FIG. 1A is an exemplary tractor truck and trailer with a fifth wheel hitch.
Figure 1B:
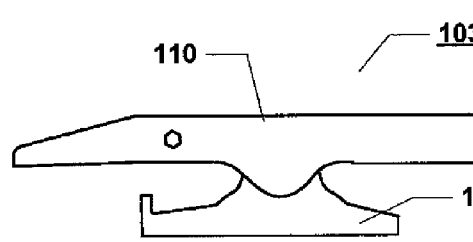
FIG. 1B is an exemplary fifth wheel hitch.
Figure 1C:
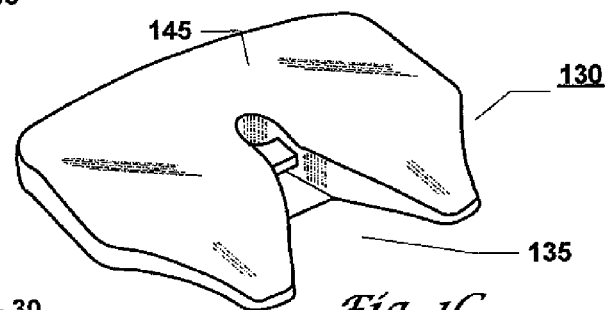
FIG. 1C is a prior art hitch plate.

Fifth wheel hitches are well known in the field of towing trailers using a truck or tractor. FIGS. 1A through 1C depict an exemplary tractor and trailer hitch arrangement employing a fifth wheel hitch. Tractor 100 is affixed with a fifth wheel hitch 103 to rear of tractor frame 105. Fifth wheel hitch 103 includes a fifth wheel hitch assembly 110 pivotally mounted on pedestal 155. Fifth wheel hitch assembly 110 comprises hitch plate 130 which houses a locking mechanism underneath (not shown but described in greater detail below) with slot 135 opening toward the aft end of fifth wheel assembly 110 for receiving a kingpin 111 from trailer 119.

Kingpin 111 typically extends from a trailer bearing plate 107, which rests upon fifth wheel assembly, specifically, upon load area 145 of fifth wheel hitch plate 130. Kingpin is, typically, a unitarily constructed article comprised of a lower flange 115 capping a shank 113 which extends from collar 117.

Figure 2:
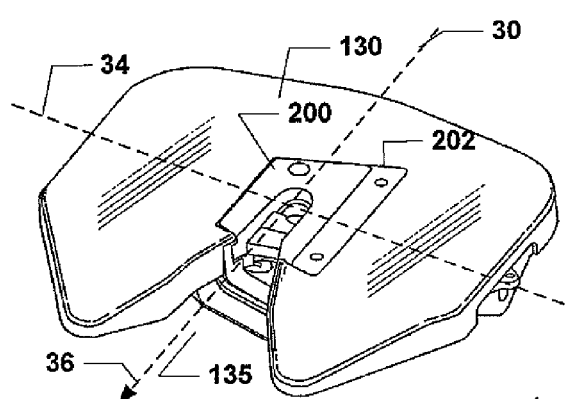
FIG. 2 is perspective view of an exemplary embodiment of a fifth wheel plate with a removable locking assembly installed.

Referring to FIG. 2, exemplary hitch plate 130 includes an exemplary removable lock mechanism cartridge 200. Hitch plate 130 includes a shaped opening 202 defined in the top surface of the plate 130 into which cartridge 200 is inserted for mounting to the hitch plate 130 as will be described in greater detail below. The longitudinal axis of the hitch plate 130 is indicated at 30 and is congruent with the longitudinal axis of the vehicle upon which the fifth wheel is installed. The transverse axis is shown at 34. The hitch plate aft end, indicated at 36 by the arrow, includes a slot, or throat, 135 to receive a trailer kingpin 111 that opens to the rear of the truck.

Figure 3A:
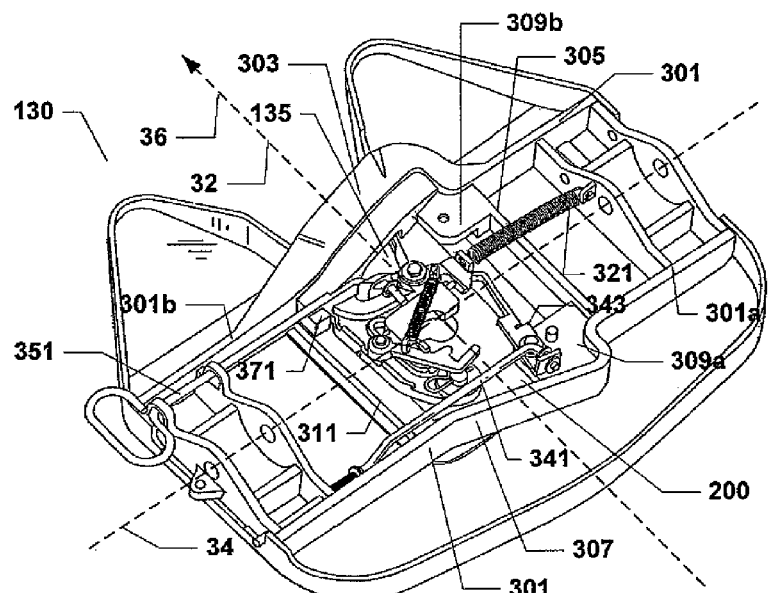
FIG. 3A is a perspective view of the underside of the fifth wheel of FIG. 2 showing an exemplary removable locking assembly installed.
Figure 3B:
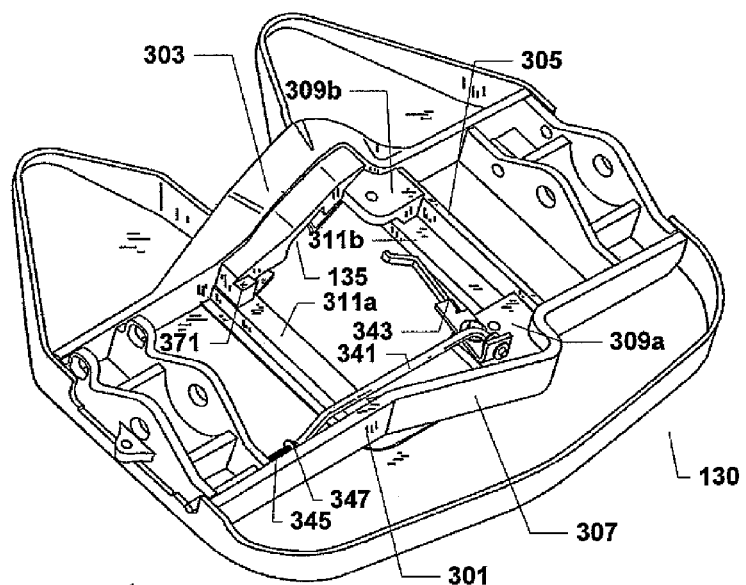
FIG. 3B is a perspective view of the underside of an exemplary fifth wheel plate with the locking mechanism cartridge removed.

FIGS. 3A and 3B depict the underside of a hitch plate referenced generally at 130, with and without the removable lock mechanism installed, respectively. Again, the longitudinal axis of the hitch assembly is indicated at 30 and the transverse axis is shown at 34. The hitch plate includes the slot 135 that is open to receive the kingpin 111. Plate 130 is configured with a chassis 301 defined by forward and rearward transverse chassis members 301*a*, *b* that provides structural support to the plate 130 and mounting support for the cartridge 200. Rearward chassis member 301*b* preferably includes a throat reinforcement member 303 that extends transversely across the underside of the plate and the spans the opening 135 to the throat (FIG. 4: 404) generally parallel to the transverse axis 34. Throat reinforcement member 303 curves downward away from the underside of the plate 103 to allow king pin to enter the locking mechanism 200 from the slot 135. It also preferably curves away rearwardly from the center of the plate in order to provide room for removal and installation of the lock mechanism cartridge 200. The chassis 301 further includes a box area comprising a longitudinal wall 305 and a forward wall 307. Mounting flanges 309a, b extend centrally from adjacent forward and rearward corners of the box area. The box area is configured with longitudinally oriented ledges 311a, b along either lateral edge of the box area extending inwardly, on which the cartridge 200 is seated when installed.

The removable cartridge 200 is shown in greater detail in FIGS. 4, 5, and 6 where mounting plate 401 includes a generally pyramidal, two-tiered, base section 405 having a top surface 403. The mounting plate 401 has a generally "u-shaped" throat 404 defined by two aftward ends 413a, 413b for receiving a kingpin shank 113. Base section 405 comprises a wider lower tier 407 and an upper tier 409, where the width of the lower tier 407 creates a ledge 411. The lower and upper tiers 407 and 409 are configured in this manner such that the walls of the upper and lower tiers are flush, i.e., no ledge, on one lateral side 406, and along the interior periphery of the u-shaped throat 404. The ledge 411, however, is present on the aftward ends 413a, b, the opposing lateral side 408, and, optionally, the front side 410. In this embodiment, the mounting plate 401 defines a trapezoidal shape, with one aftward end 413a extending slightly shorter than the other end 413b.

The locking mechanism is attached to the underside of the mounting plate 401 as best illustrated in FIG. 5. A cam arm 501 is pivotally attached at one end 521 to the forward area of the underside of the mounting plate 401. Cam arm 501 is generally "L"-shaped or "C"-shaped, with a leg disposed generally in the longitudinal direction transitioning to a transverse leg extending across the u-shaped throat 404 with a free end 523. The transverse leg preferably comprises an aftward side with a curving profile. A flange 510 extends downward from the cam arm free end 523 with an opening 516 defined therein.

Figure 5B:
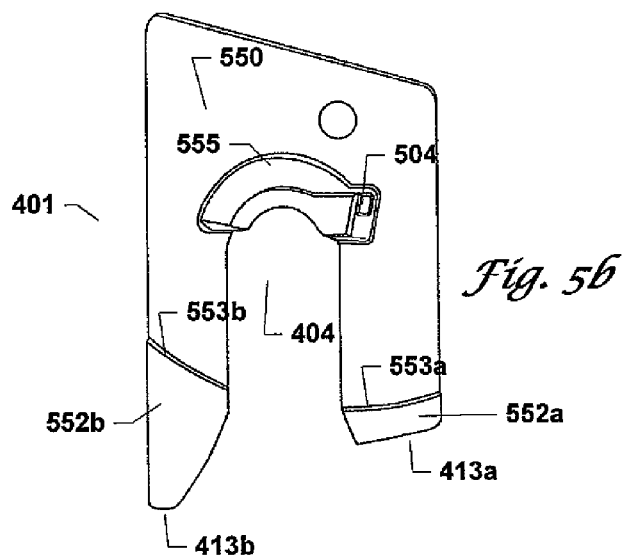
FIG. 5 is a perspective view of the underside of an exemplary locking mechanism cartridge.
FIG. 5A is a detailed view of a sliding jaw (505) as described with reference to FIG. 5.
Figure 5C:
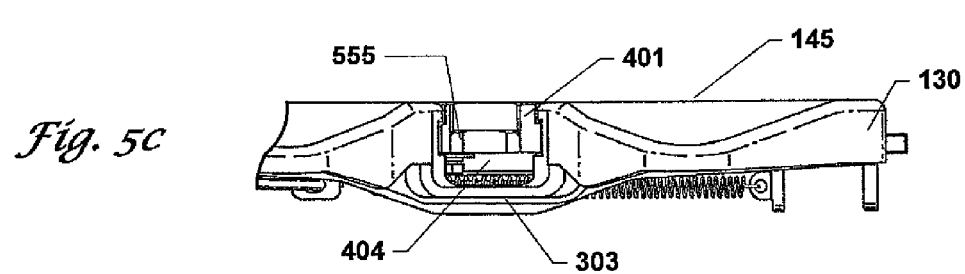

To accommodate the locking mechanism 200, and with reference to FIGS. 5b and 5c, the underside of the mounting plate 401 is formed with a planar region comprising a majority of the underside extending from the forward edge, abutting the front side 410, to about midway between the aftward ends 413a, b and the u-shaped throat 404. At this point, the underside of the aftward ends 413a, b each comprise a downward extension 552a, b, each of which are bounded on its forward edge by a curving wall 553a, b, which matches the curving profile of the transverse leg of the cam arm 501. Thus, this wall 553 serves as a cradle for the cam arm 501 when it is in the closed position, and contributes to load transfer from the kingpin to the mounting plate 401 and to the hitch plate 130. The underside of the plate also preferably comprises a support ridge 555 located about the periphery of the forward edge of the u-shaped throat 404. The ridge 555 comprises a substantially vertical arcuate wall that is an extension of the wall defining the u-shaped throat 404 and extends downward a sufficient distance such that the extending ridge 555 is in full contact with the kingpin 111 shank 113.

A bumper arm 503 is pivotally attached at one end 525 to the longitudinally disposed leg of the cam arm 501, having a first and second fingers extending interiorly from the opposing free end, defining a space 528 in between the fingers. Bumper arm 503 is mounted so that the free end is oriented toward the interior of the mechanism. A bumper stop 504 extends downwardly from the mounting plate 401. Bumper arm 503 also includes a flange 506 extending downwardly from the arm and in which is defined an opening.

A secondary lock member 507 is pivotally attached by one end to cam arm 501 near the free end thereof and having a free end oriented transversely toward the opposing side where the cam arm 501 transitions from a longitudinal orientation to a transverse orientation. A flange 508 extends downwardly from the secondary lock, preferably from the region of the attached end, with an opening defined therein. A protruding blade 509 extends downward from the secondary lock member 507, and an opening 536 is defined within the protruding blade 509. As shown in FIGS. 3A&B, in the area of the juncture of the longitudinal ledge 311a along the lateral side and the rearward chassis member 301b, a detent 371 extends forward of the chassis member 301b, and downward from the ledge 311a underside. The detent 371 includes an interior facing side that engages the free end of the secondary lock member 507 when the lock mechanism 200 is in the closed position as will be described below.

A sliding jaw 505 is seated on the forward side of the transverse cam arm 501 leg and is slidably mounted to a slide pin 511 which extends from the cam arm 501 longitudinal leg to the cam arm 501 free end 523 forward of the cam arm 501 transverse leg and generally parallel thereto. As best viewed in FIG. 5a, a compression spring 513 surrounds the pin 511 and biases the sliding jaw 505 away from the inside of the longitudinal leg of the cam arm 501. A tension spring 521 is attached by one end to the opening in the bumper arm downward flange 506 and by the opposing end to the secondary lock member downward flange 508 through the respective openings defined therein.

The assembly 200 also includes a wedge member 601 that abuts lateral side 406 when installed in a hitch plate. Lateral side is sloped, declining from the top portion. Accordingly, wedge member 601 is angled to be seated flush with the lateral side 406. Wedge member 601 includes bore holes for fasteners, that correspond to openings defined in the mounting flanges 309a, b within the box area of the chassis. Wedge member 601 also has a top surface 604, and has a cross-sectional shape such that the top surface 604 is flush with the mounting plate top surface 403 when installed.

Figure 7A:
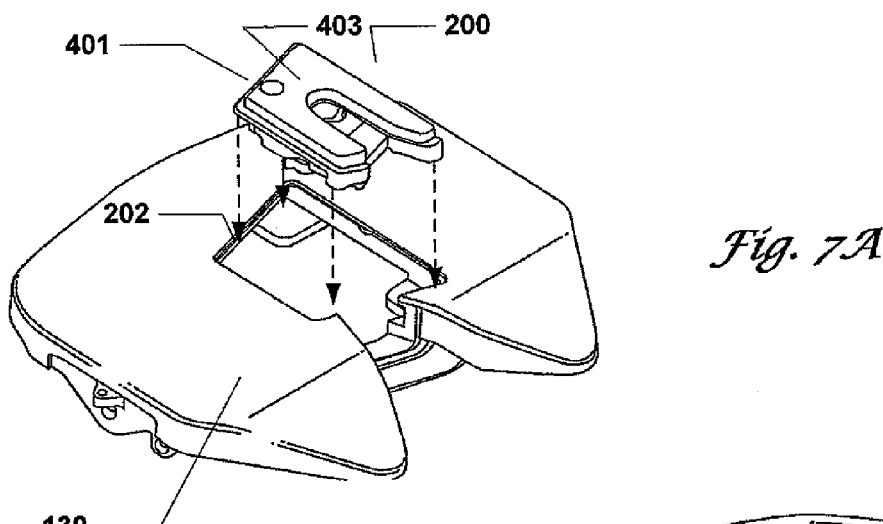
FIGS. 7A through 7C illustrate the insertion and installation of an exemplary locking mechanism cartridge into an exemplary fifth wheel hitch.
Figure 7B:
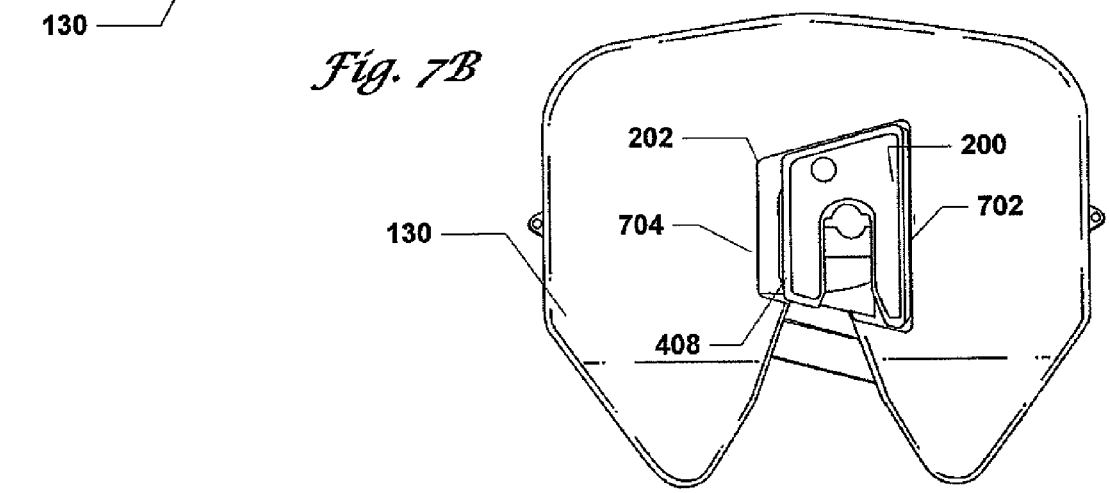
Figure 7C:
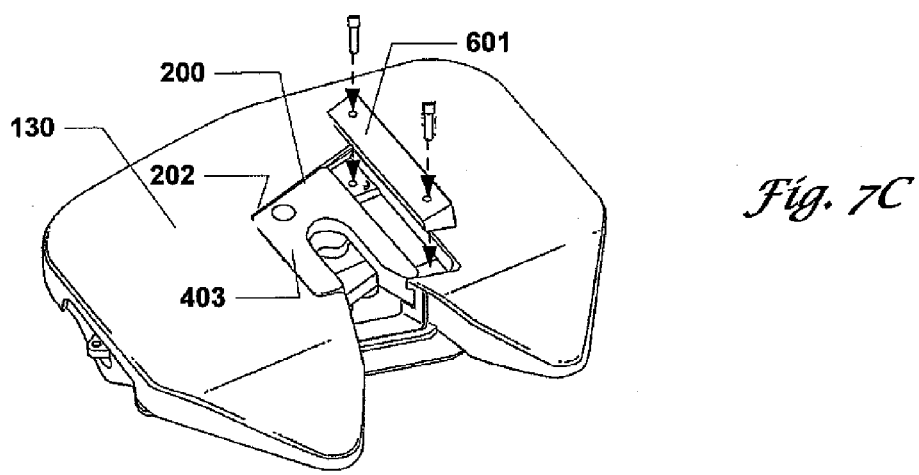

FIGS. 7A-7C show how the lock mechanism cartridge 200 is installed in the hitch plate 130. In this embodiment, shaped opening 202 defines a generally trapezoidal shape with one lateral side of the opening 702 being larger in area than the other 704. Cartridge 200 placed in the opening 202 in this larger area 702 (FIG. 7B) and moved laterally to the opposing side which is smaller in area. Upper tier 409 is dimensioned to fit snugly within the smaller side 704 of the opening 202. Lower tier 407 slides under the plate 130 so that circumferential ledge 411 engages the under side of the plate 130. Wedge 601 is then installed in the gap between the edge of the opening 202 and the flush side 406 of the mounting plate 401. Vertical mores are defined in the wedge 601 that correspond with mounting apertures in mounting flanges 309a, b, and fasteners are inserted therethrough to attached the wedge to the mounting flanges and keep the cartridge 200 forced in place in the smaller area 704.

Returning to FIGS. 3A&B, the mechanism includes a lock release rod 351 having a curved end inserted through the aftward side of the opening 536 defined in the blade 509 extending from the secondary lock member 507. The lock release rod 351 extends laterally from the interior of the plate through the plate walls to the exterior lateral side of the plate, where the end may be formed into a loop to act as a handle for allowing a user to grip the lock release. A main tension spring 321 is attached by an interior end to opening 516 in the downward flange 510 of the cam arm 501 and by a laterally disposed end to an outward portion of the hitch plate underside opposing the locking mechanism 200. Main tension spring 321 imparts tension to bias the lock mechanism 200 to the closed position.

A lock indicator shaft 341 is connected at an interior end to the forward end of a generally longitudinally disposed rotating member 343 that is pivotally mounted to the underside of the fifth wheel. The indicator rod extends laterally from the interior of the fifth wheel. The outer frame of the fifth wheel includes one or more apertures through which the indicator shaft may extend when the lock is in the closed position as will be described more fully below. The indicator shaft preferably includes a compression spring 345 acting upon a flange 347 circumferentially disposed about the indicator shaft for a counter-force to bias the indicator toward the interior of the fifth wheel. Rotating member 343 includes a free end 349 toward the aftward area, which contacts the free end of the cam arm when the lock mechanism 200 is installed and the mechanism is in the closed position.

Figure 8:
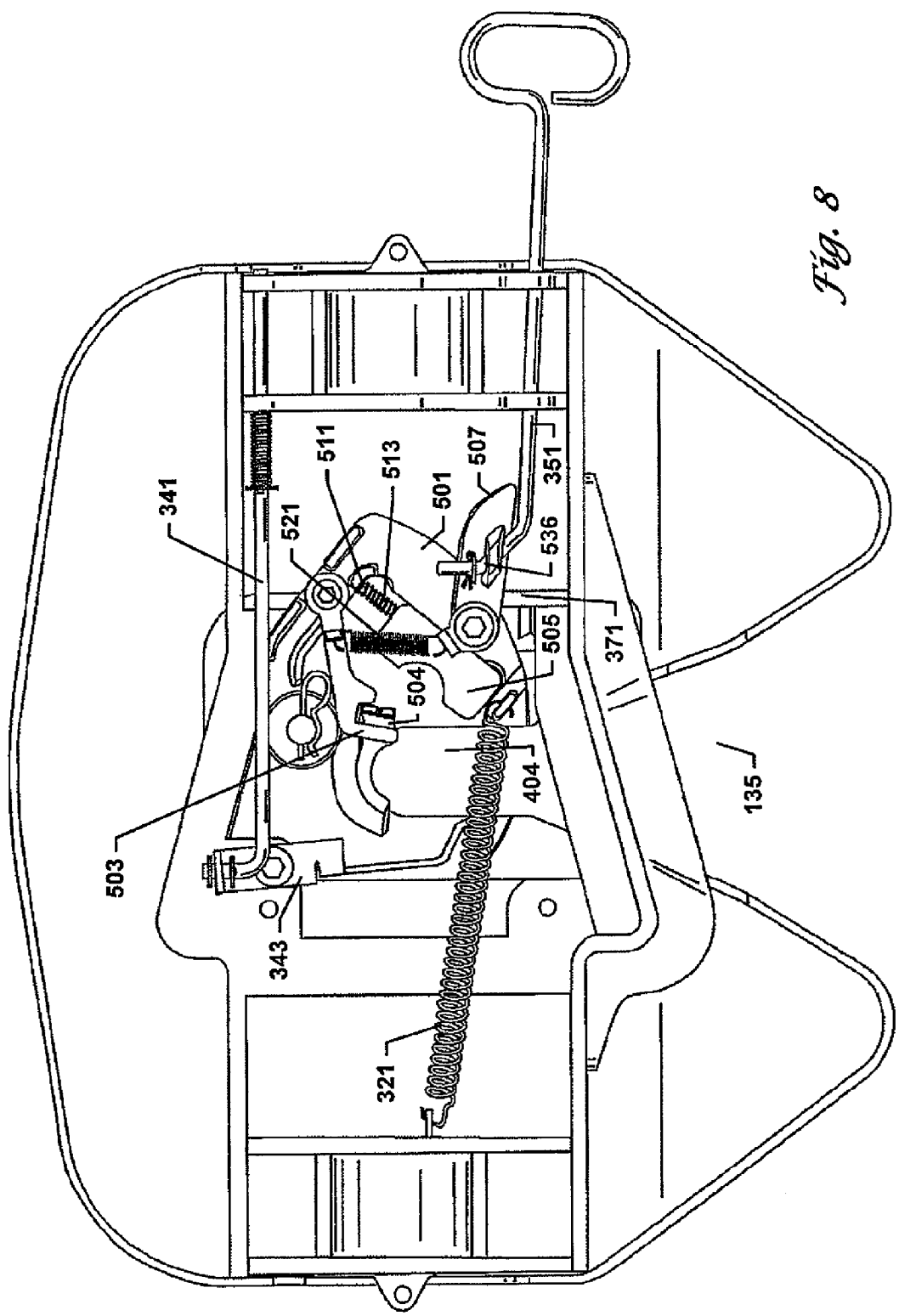
FIG. 8 is a plan view of the underside of an exemplary hitch plate showing an exemplary locking mechanism in the open position.

Operation of the locking mechanism will now be described. FIG. 8 depicts the locking mechanism in the open position and there is no kingpin received in the throat area. At this point, main spring 321 imparts tension on the free end of the cam arm 501 to close. Cam arm 501 is held in the open position by the attached bumper arm 503 because the bumper's second aftward extending finger is seated against the bumper stop 504 preventing lateral movement of the jaw assembly. In this position, the sliding jaw 505 is held in the retracted position by a centrally-tending crook in the arm 501.

To initiate closing of the lock mechanism, a trailer kingpin is received through the slot 135 and into the u-shaped throat 404. When the kingpin engages the forward end of the throat 404, the lower flange 115 (see FIG. 1A) of the kingpin contacts the first aftward extending finger of the bumper 503. Continued forward motion of the kingpin thereby pushes the bumper arm 503 forward releasing it from the bumper stop 504. Once the bumper arm 503 is clear of the bumper stop 504, the jaw assembly is free to react to the tension imparted by the main tension spring 321 and it begins to swing laterally to the closed position.

As the cam arm 501 swings to the closed position, the sliding jaw 505 contacts the aftward side of the kingpin along its shank 113 (FIG. 1A). Sliding jaw 505 is configured with a recess that seats snugly against the rear circumference of the shank 113. When the jaw assembly reaches the fully closed position, shown in FIG. 3A, sliding jaw 505 is fully seated against the rear side of the kingpin and remains in that position though the cam arm continues to swing fully closed as the sliding jaw rides along the pin 511 by which the sliding jaw is slidably mounted to the cam arm 501, pushed by compression spring 513.

The closing of the jaw assembly also moves the secondary lock member 507 toward the interior of the fifth wheel and aft of the sliding jaw 505. The lock release rod 351 is attached by a curved end inserted through the opening 536 in the downward extending blade 509 of the secondary lock at an attachment point that is aftward of the center axis of the rotatable secondary lock. The closing movement of the locking mechanism also draws the lock release rod 351 inward by virtue of its connection to the secondary lock 507.

As the cam arm 501 swings laterally to the closed position, the bumper arm 503 is rotated clockwise through pushing against the bumper stop 504. Additionally, the secondary lock 507 is drawn toward the interior, its free lateral end is rotated aftward through the tension imparted by the tension spring 521 connected to both the bumper arm 503 and the secondary lock 507. The detent 371 prevents full rotation of the secondary lock 507 until the lock member free end clears the detent. At that point, the free end rotates aftward so that it extends aftward beyond the detent 371. In case the main spring fails, the free end of the secondary lock 507 is forced against the interior surface of the detent 371, preventing the locking mechanism from fully opening.

When the lock mechanism is in the open position, the indicator shaft 341 is drawn within the interior of the fifth wheel and so, not easily visible. As the cam arm 501 slides to fully engage the kingpin and the lock assembly rotates to the closed position, the end of the cam arm 501 contacts and moves a free end of the rotating member 343 which, in turn pushes the indicator rod 341 laterally to extend through the fifth wheel frame. The extension of the rod through the frame is, therefore, an indication to the operator that the lock is engaged. Preferably, the tip of the rod visible on the outside of the fifth wheel is a bright, easily visible color.

Opening the lock to disengage the kingpin is accomplished by exerting an outward pulling force on the lock release rod 351, the interior end of which is attached to the secondary lock 507. The off-axis attachment of the rod to the secondary lock 507 causes the lock to rotate in a counter-clockwise direction, as viewed in the figures, so that the free end rotates forward and clears the detent. Pulling force also rotates the cam arm 501 until its crooked end catches the aft corner of the sliding jaw 505. Then as the cam arm 501 rotates, it pulls the sliding jaw 505 with it and away from the kingpin. The bumper arm 503 rotates aft and is drawn laterally until it engages the bumper stop 504 in the space 528 between the two aftward extending fingers, locking the locking mechanism in the open position. It should be noted that when the lock is initially disengaged, the first finger of the bumper arm 503 is drawn up from the kingpin and is forced into the space between the kingpin 111 and the bumper stop 504. This prevents the lock from closing, allowing it to remain open while the operator can drive the truck from under the trailer and draw the fifth wheel away from the kingpin 111.

As described above and shown in the associated drawings, the present invention comprises a fifth wheel coupling assembly with removable locking mechanism. While particular embodiments of the invention have been described, it will be understood, however, that the invention is not limited thereto, since modifications may be made by those skilled in the art, particularly in light of the foregoing teachings. It is, therefore, contemplated by the following claims to cover any such modifications that incorporate those features or those improvements that embody the spirit and scope of the present invention.

What is claimed is:

1. A fifth wheel hitch comprising:
  a. a hitch plate having a load surface and an underside and including an aperture defined within said load surface and a chassis supporting said hitch plate from said underside, said chassis defining a box open to said aperture;
  b. a mounting plate insertable into said aperture and removably attachable within said box, said mounting plate formed with a u-shaped throat dimensioned to receive a trailer kingpin having a closed end and an open end defined by first and second extensions, said mounting plate having a top surface configured to be co-planar with said load surface when seated within said box, and a bottom surface configured with a planar mounting area bounded by a curved wall located roughly midway along said first and second extensions, and including a stop extending away from said bottom surface adjacent said throat;

c. a locking mechanism for retaining said kingpin against said closed end of said throat comprising:

i. a cam arm having a longitudinal leg transitioning to a transverse leg and pivotally attached by an attached end of said longitudinal leg to the bottom surface of said mounting plate and operable for allowing said transverse leg to be moved across the throat, said transverse leg terminating with a free end;

ii. a bumper arm pivotally attached at one end to said longitudinal leg and having a free end with first and second finger members defining a space therebetween for engaging said stop;

iii. a sliding jaw member slidably mounted to a portion of said transverse leg opposing said closed end of said throat and biased toward said free end of said transverse leg, said sliding jaw member having a recess shaped to snugly retain the kingpin against said closed end;

iv. a secondary lock member pivotally mounted to a said transverse leg at an intermediate point along said lock member, said lock member having an end proximate said free end of said transverse leg, and a latch end distal therefrom;

v. a tension member attached between said bumper arm and said secondary lock such that said bumper arm and said proximate end of said secondary lock are biased to rotate toward each other;

d. a second tension member having a first end attached to said free end of said cam arm and a second end attached to an outward portion of said hitch plate underside; and e. a detent extending from a corner of said box for engaging said latch end of said secondary lock member.

2. The fifth wheel hitch of claim 1, further comprising a wedge member installable within said box with said mounting plate and formed to retain said mounting plate within said box, said wedge member having a top surface co-planar with said top surface of said mounting plate and said load surface when so installed.

3. The fifth wheel hitch claim 2, wherein said box further comprises one or more mounting flanges, and within each of said one or more mounting flanges a fastening bore is defined.

4. The fifth wheel hitch of claim 3, wherein said wedge member further comprises one or more fastening bores corresponding to said fastening bores of said one or more mounting flanges when said wedge member is installed within said box.

5. The fifth wheel hitch of claim 1, further comprising a lock indicator rod operable to extend beyond a lateral frame of said hitch plate when lock mechanism fully encloses said kingpin within said throat area.

6. The fifth wheel hitch of claim 5, further comprising a wedge member installable within said box with said mounting plate and formed to retain said mounting plate within said box, said wedge member having a top surface co-planar with said top surface of said mounting plate and said load surface when so installed.

7. The fifth wheel hitch claim 6, wherein said box further comprises one or more mounting flanges, and within each of said one or more mounting flanges a fastening bore is defined.

8. The fifth wheel hitch claim 6, wherein said chassis further comprises one or more mounting flanges, and within each said one or more mounting flanges a fastening bore is defined.

9. The fifth wheel hitch of claim 7, wherein said wedge member further comprises one or more fastening bores corresponding to said fastening bores of said one or more mounting flanges when said wedge member is installed within said box.

10. The fifth wheel hitch of claim 7, wherein said wedge member further comprises one or more fastening bores corresponding to said fastening bores of said one or more mounting flanges when said wedge member is installed within said chassis.

11. The fifth wheel hitch of claim 1, further comprising a release rod having a first end coupled to an attachment flange extending perpendicularly from a portion of said secondary lock member between the intermediate point and said latch end such that axial pulling movement of said release rod away from said attachment flange causes said secondary lock member latch end to rotate free of said detent.

12. The fifth wheel hitch of claim 11, further comprising a lock indicator rod operable to extend beyond a lateral frame of said hitch plate when lock mechanism fully encloses said kingpin within said throat area.

13. The fifth wheel hitch of claim 12, further comprising a wedge member installable within said box with said mounting plate and formed to retain said mounting plate within said box, said wedge member having a top surface co-planar with said top surface of said mounting plate and said load surface when so installed.

14. The fifth wheel hitch claim 13, wherein said box further comprises one or more mounting flanges, and within each of said one or more mounting flanges a fastening bore is defined.

15. The fifth wheel hitch of claim 14, wherein said wedge member further comprises one or more fastening bores corresponding to said fastening bores of said one or more mounting flanges when said wedge member is installed within said box.

16. A removable locking mechanism for a fifth wheel hitch comprising:

a. a mounting plate removably attachable within a fifth wheel chassis, said mounting plate formed with a u-shaped throat dimensioned to receive a trailer kingpin having a closed end and an open end defined by first and second extensions, said mounting plate having a top surface configured to be co-planar with a fifth wheel hitch plate load surface when seated within said chassis, and a bottom surface configured with a planar mounting area bounded by a curved wall located roughly midway along said first and second extensions, and including a stop extending away from said bottom surface adjacent said throat;

b. a locking mechanism for retaining the kingpin against said closed end of said throat comprising:

i. a cam arm having a longitudinal leg transitioning to a transverse leg and pivotally attached by an attached end of said longitudinal leg to the bottom surface of said mounting plate and operable for allowing said transverse leg to be moved across the throat, said transverse leg terminating with a free end;

ii. a bumper arm pivotally attached at one end to said longitudinal leg and having a free end with first and second finger members defining a space therebetween for engaging said stop;

iii. a sliding jaw member slidably mounted to a portion of said transverse leg opposing said closed end of said throat and biased toward said free end of said transverse leg, said sliding jaw member having a recess shaped to snugly retain the kingpin against said closed end;

iv. a secondary lock member pivotally mounted to a said transverse leg at an intermediate point along said lock member, said lock member having an end proximate said free end of said transverse leg, and a latch end distal therefrom for engaging a detent extending from a corner of said chassis;

v. a tension member attached between said bumper arm and said secondary lock such that said bumper arm and said proximate end of said secondary lock are biased to rotate toward each other; and c. a second tension member having a first end attached to said free end of said cam arm and a second end attached to an outward portion of said hitch plate underside.

17. The locking mechanism of claim 16, further comprising a wedge installable within said chassis with said mounting plate and formed to retain said mounting plate within said chassis, said wedge member having a top surface co-planar with said top surface of said mounting plate and said load surface when so installed.

18. A fifth wheel hitch comprising:
   a. a hitch plate having a load surface and a chassis supporting said hitch plate from underneath, said chassis including one or more mounting flanges, and within each said one or more mounting flanges a fastening bore is defined;
   b. a mounting plate removably attachable within said chassis, said mounting plate formed with a u-shaped throat having a closed end dimensioned to receive a trailer kingpin, said mounting plate having a bottom surface;
   c. a locking mechanism for retaining said kingpin against said closed end of said throat comprising:
      i. a c-shaped cam pivotally attached by an attached end to said bottom surface of said mounting plate and operable for allowing a free end of said cam to be moved across the throat for snugly retaining a trailer kingpin against said closed end;
      ii. a bumper arm pivotally attached at one end to said cam and having a free end operable for engaging a stop extending from said bottom surface;
      iii. a secondary lock member pivotally mounted to a said cam proximal said free end, at an intermediate point along said lock member, said lock member having an end proximal said free end, and a latch end distal therefrom for engaging a detent extending from a corner of said chassis;
      iv. a tension member attached between said bumper arm and said secondary lock such that said bumper arm and said proximal end of said secondary lock are biased to rotate toward each other;
   d. a second tension member having a first end attached to said free end of said cam and a second end attached to an outward portion of said hitch plate underside.

19. The fifth wheel hitch of claim 18, further comprising a sliding jaw member slidably mounted to a portion of said cam opposing said closed end of said throat and biased toward said free end, said sliding jaw member having a recess shaped to snugly abut a trailer kingpin.

\* \* \* \* \*